United States Patent [19]

Selanger

[11] Patent Number: 4,782,279

[45] Date of Patent: Nov. 1, 1988

[54] METHOD AND ARRANGEMENT FOR CHARGING A SEALED, SECONDARY ELECTROCHEMICAL POWER SOURCE

[75] Inventor: Per A. Selanger, August och Huldas väg, Sweden

[73] Assignee: Sab Nife AB, Landskrona, Sweden

[21] Appl. No.: 8,358

[22] Filed: Jan. 29, 1987

[30] Foreign Application Priority Data

Feb. 4, 1986 [SE] Sweden .................... 8600483

[51] Int. Cl.$^4$ .............................................. H02J 7/16
[52] U.S. Cl. ........................................ 320/46; 320/2; 429/72
[58] Field of Search .............. 320/46, 2, 31; 429/72

[56] References Cited

U.S. PATENT DOCUMENTS

| | | | |
|---|---|---|---|
| 2,862,986 | 12/1958 | Strauss | 204/2.1 |
| 3,393,094 | 7/1968 | Stanimirovitch | 429/60 |
| 3,502,504 | 3/1970 | White | 429/81 |
| 3,584,285 | 6/1971 | Goodkin et al. | 320/46 |
| 3,906,330 | 9/1975 | Salamon et al. | 320/46 |
| 4,436,795 | 3/1984 | Cooper et al. | 429/53 |

FOREIGN PATENT DOCUMENTS

| | | | |
|---|---|---|---|
| 513567 | 6/1955 | Canada. | |
| 0194992 | 3/1965 | Sweden. | |
| 0302320 | 7/1968 | Sweden. | |
| 0544022 | 5/1977 | U.S.S.R. | 320/46 |
| 2154052A | 8/1985 | United Kingdom | 320/2 |

OTHER PUBLICATIONS

Alkaline Storage Batteries, S. Uno Falk & Alvin J. Salkind, John Wiley & Sons, Inc., NY, 1969, pp. 392–418.

Grenzen und Moglichkeiten elektrochemischer Stromspeicher, Dietrick Berndt, Elektrische Bahnen 1984, Issue 11, pp. 339–346.

Effects of Oxygen Partial Pressure on Fuel Cell Cathodes, A. J. Hartner, M. A. Vertes, V. E. Medina, & H. G. Oswin, Lessona Moos Laboratories, Great Neck, NY, pp. 141-152, 1964.

Primary Examiner—Patrick R. Salce
Assistant Examiner—Anita M. Ault
Attorney, Agent, or Firm—Laurence R. Brown; Alfred J. Mangels

[57] ABSTRACT

A method for charging a sealed, secondary electrochemical power source having with a water based electrolyte (20), a gas space (20) and the possibility of recombination in accordance with the oxygen cycle during pressure stabilization at a low controlled level. Charging takes place at a constant d.c. voltage whilst the pressure inside the gas space of the power source is reduced by evacuation. An arrangement for implementing the method consists essentially of a vacuum pump which is connected to the gas space of the power source via an evacuation line, and of a constant d.c. voltage source. The vacuum pump is so arranged as to come into operation when the power source is being charged.

10 Claims, 4 Drawing Sheets

METHOD AND ARRANGEMENT FOR CHARGING A SEALED, SECONDARY ELECTROCHEMICAL POWER SOURCE

TECHNICAL FIELD

The present invention relates to a method for charging a sealed, secondary electrochemical power source with positive and negative electrodes, a water-based electrolyte and a gas space, and with oxygen recombination at at least some part of the surface of the negative electrodes or of a plate tab associated therewith. The invention also relates to an arrangement for implementing the method.

DESCRIPTION OF THE PRIOR ART

Previously disclosed systems for providing maintenance-free operation of secondary electrochemical power sources with a water-based electrolyte, such as nickel/cadmium and lead/acid accumulators, seek to overcome the problem related to gas generation, in particular during charging, primarily by two different methods.

One method is based on a fundamental standard, vented type of cell with free electrolyte, in which the charging gases hydrogen and oxygen are transformed into water by means of a catalyst, usually of the Pt or Pd type and situated in or adjacent to the gas space of the cell. This method has a number of familiar weaknesses. A fundamental weakness is that the generation of hydrogen and oxygen never takes place in a completely stoichiometric fashion within the cell, for which reason the material balance cannot be assured fully by means of catalysts. Also, the transformation of hydrogen and oxygen into water is associated with the production of a considerable quantity of heat, which situation constitutes a risk, in spite of various protective measures relating to charging routines and constructional measures for heat dissipation. The costs of the catalysts and the arrangements in conjunction therewith are also considerable. The methods in accordance with this principle thus find limited practical application.

The other method, the application of which is totally predominant in order to achieve freedom from maintenance, is based partly on reducing the generation of hydrogen to a negligible level through an appropriately specified surplus of uncharged, negative active material, and partly on dealing with any oxygen which is generated by causing it to react with the surface of the negative electrode. The latter reaction is known as recombination in accordance with the oxygen cycle, to which the rest of this document relates. The recombination is facilitated by easier transport of the oxygen gas to the negative electrode, which is usually achieved by the use of porous separators partially filled with electrolyte. Both nickel/cadmium and lead/acid cells operating in accordance with this principle have found widespread application. Both systems have their limitations and disadvantages, however.

Sealed nickel/cadmium cells constitute examples of systems which adhere closely to the principles of the latter method. A major disadvantage, however, is the dimensional limitation of the system and the associated restriction of the Ah capacity of each cell. Oxygen recombination is encouraged not only by partially fluid-filled separators, but also by short transport routes, that is to say the compact arrangement of the plate system. Recombination is associated with a significant production of heat, however, the removal of which must be ensured by appropriate cell geometry. The result of this is a limitation to smaller cell dimensions, normally less than about 20 Ah. Furthermore, constant-voltage charging should be avoided, since this method of charging can lead to the destruction of the power source by so-called 'thermal runaway'; see, for example, S.U. Falk and A.J. Salkind, Alkaline Storage Batteries, John Wiley & Sons, Inc., 1969, pp. 394–395. The charging procedure accordingly calls for an appropriately specified current limitation.

Different arrangements have been proposed with the aim of adapting large-dimension Ni-Cd cells with free electrolyte to this principle of maintenance-free operation. U.S. Pat. No. 3,502,504 and U.S. Pat. No. 4,436,795 can be taken as examples of this. The pressure conditions in these cells and thus the strength requirements imposed on the construction of the cell vessels nevertheless involve major restrictions on the charging conditions and lead to a situation in which low charging currents must be accepted, and with them long charging periods.

The lead/acid system does not entirely meet the principles of this method, since the generation of hydrogen cannot be fully suppressed. This leads to a restriction in the available service life of the power source and clearly imposes a requirement for the ventilation of any hydrogen which is produced. The conditions associated with this cell system also involve, in relation to the freely vented lead/acid system, a tendency towards increased corrosion of the grid framework of the positive plates, which also has the effect of limiting the service life. See D. Berndt, Elektrische Bahnen 82 (1984), pp. 338–346, and in particular pp. 345–346.

Most of the aforementioned disadvantages of the previously disclosed systems can be influenced only by varying the conditions of the electrode reactions. The creation of circumstances which permit uncomplicated charging, preferably at constant voltage, concurrently with the generation of a low level of oxygen gas, associated with the generation of a small quantity of heat would open up new, wide areas of application for the maintenance-free operation of secondary, electrochemical power sources.

THE INVENTION

The problem has been solved by a charging method in accordance with the present invention, which is characterized in that the charging of the power source takes place at a constant d.c. voltage whilst the pressure of the gas space is reduced by evacuation from atmospheric pressure to a level not below the vapour pressure of the water present in the power source.

The expression 'constant d.c. voltage' shall be understood in this context not necessarily to denote absolute voltage constancy, but rather that the d.c. voltage is the main controlling parameter. A photovoltaic voltage characteristic, for example, is hereby also included.

The invention is based on a circumstance which has been overlooked until now in this context, namely that the recombination current increases as a function of the partial pressure of the oxygen at a constant voltage for a given cell configuration. The theory relating to this is discussed by A.J. Hartner et al. in Fuel Cell Systems, Advances in Chemistry Series 47, American Chemical Society, 1965, pp. 141–152. By stabilizing the gas pressure in the power source at a low level and by charging at an appropriately specified constant voltage, it has proved possible to achieve controllable conditions for both the production and the recombination of oxygen gas, and thus also for the generation of heat within the system, and for the downward regulation of the charging current during the final phase of the charging procedure to a low steady state, known as float charging.

The drop in pressure within the gas space of the power source which can be utilized under practical conditions is limited by the vapour pressure of the water in the electrolyte. In order to achieve suitable conditions, it is not necessary to continue with the evacuation to this extent, as will be appreciated from the illustrative embodiments which will be described later.

In the case of the method in accordance with the invention, the evacuation of the gas space and the charging of the power source are preferably initiated simultaneously. Evacuation can, if found appropriate, take place only during an initial phase of the charging operation, or it may be repeated intermittently throughout the charging operation. Evacuation may appropriately take place by means of a vacuum pump, or at application in outer space by utilizing the space as a recipient.

The invention also includes an arrangement for the implementation of the method, comprising a sealed, secondary electrochemical power source with positive and negative electrodes, a water-based electrolyte and a gas space, in conjunction with which a vacuum pump is connected to the gas space via an evacuation line and is so arranged as to come into operation during charging of the power source, and in conjunction with which a d.c. voltage source, such as a rectifier, is so arranged as to maintain a constant charging voltage to the power source.

The electrochemical power source may consist of one or more batteries, each with one or more cells, the gas space of which is common to the cells in one and the same battery. Each gas space is appropriately provided with at least one re-sealing safety vent which prevents the battery casing from being exposed to harmful overpressure. Overpressure may conceivably occur in a battery which is unintentionally subjected to polarity inversion. The arrangement may also appropriately be provided with a control device for switching on the vacuum pump when the d.c. voltage source comes into operation for charging. It may also be advantageous to provide the evacuation line with a check valve to facilitate the maintaining of an established vacuum.

In the case of applications in outer space, the vacuum pump may be replaced by a connection between the gas space and the external recipient provided via the evacuation line, which in this case may appropriately be provided with a solenoid valve capable of being so activated as to permit evacuation of the gas space at a certain predetermined pressure level. For this purpose the arrangement should preferably include a control device which comes into operation in conjunction with the initiation of charging.

The invention provides a number of benefits, certain of which are easily appreciated, whereas others appear totally surprising. The following benefits in particular will be noted amongst the former:

Constant-voltage charging

This charging procedure is usually preferred in conjunction with vented power sources. In accordance with the invention this can also be applied to corresponding sealed systems, such as to sealed nickel/cadmium cells, for example, which were previously not suitable for this.

Low oxygen production—low steady-state current

In many applications it is customary for the charging state of the battery to be maintained by continuous charging. In the case of sealed nickel/cadmium cells, for example, this is normally provided by constant current charging, known as 'trickle-charging', for which a current of approximately 25 mA per Ah of cell capacity is required. By the application of the method in accordance with the invention, and thus by utilizing constant voltage charging, it is possible to lower the steady-state current radically for the same cells, namely to 0.05–5 mA/Ah.

Low oxygen production - low recombination requirement

There is no need for recombination to be facilitated in any particular fashion, for example through partially fluid-filled separators, but the invention can be applied to batteries with free electrolyte. Recombination can thus be allocated to any cathodically polarized metal surface in the cell, and not necessarily to the active surface of the negative plates. It can thus be allocated to the boundary zone where the plate tabs or the lugs pass between the electrolyte and the gas space, by utilizing the so-called 'waterline effect'. This effect is already familiar, for example from CA-A-513,567, as a disadvantage, since it causes self-discharge. The reaction can thus instead be made useful through the invention.

Low recombination - little heat generation

The reduced recombination requirement of the method in accordance with the invention leads to an equivalent reduction in heat generation. The risk of 'thermal runaway' (see above) is eliminated, in addition to which considerable freedom is achieved with regard to cell dimensioning. Each dimension and configuration of the cell systems referred to here with a satisfactory function in vented design is capable, in principle, of being adapted to sealed operation through the application of the method in accordance with the invention.

The invention also provides totally surprising benefits, as follows:

A cathode surplus is not necessary from the point of view of the fundamental function. The invention provides a possibility for regulating the recombination current to comparatively low values, which in this case do not polarize the negative electrode to the negative potentials which lead to the generation of considerable quantities of hydrogen gas. Accordingly, there is no need to reduce the polarization of the negative electrode through large surplus areas. It has been found that the cell functions well under conditions of either surplus or deficit with regard to the electrode balances, which means that the previously customary surplus of active material in negative electrodes can be dispensed with. Thus, by the method in accordance with the invention, the relationship between the overall capacity of the positive and negative plates can be adjusted on the basis of other preferences, such as their discharge performance.

Suppression of hydrogen gas generation

A considerable reduction in the quantity of hydrogen gas which is generated is achieved thanks to the comparatively low floatcharging current, down to which the cell can be regulated, and thanks to the resulting low electrode polarization. For some sealed lead batteries of present design it is pointed out that the hydrogen generation can be accepted. In the case of the present invention a definitive reduction to negligible levels is achieved in the quantity of hydrogen gas generated in the majority of stationary applications under operating conditions at ambient temperature.

BRIEF DESCRIPTION OF THE DRAWINGS

The invention is now described in more detail with reference to the accompanying drawings.

DESCRIPTION OF PREFERRED EMBODIMENTS

Figure 1:
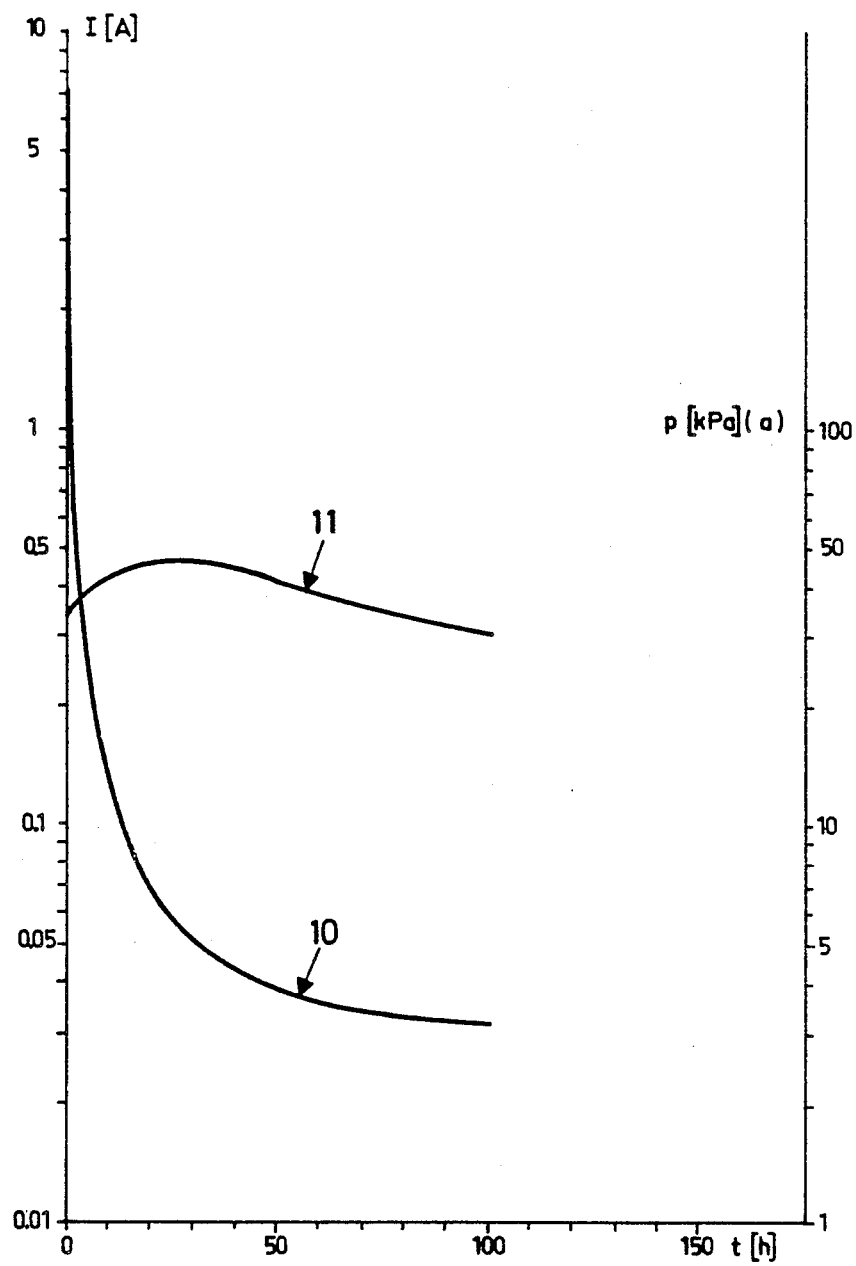
FIG. 1 is a graph which shows the charging current and the gas pressure as a function of the charging time for a sealed nickel/cadmium cell during charging in accordance with the invention at a constant voltage of 1.40 V at 40° C.
Figure 2:
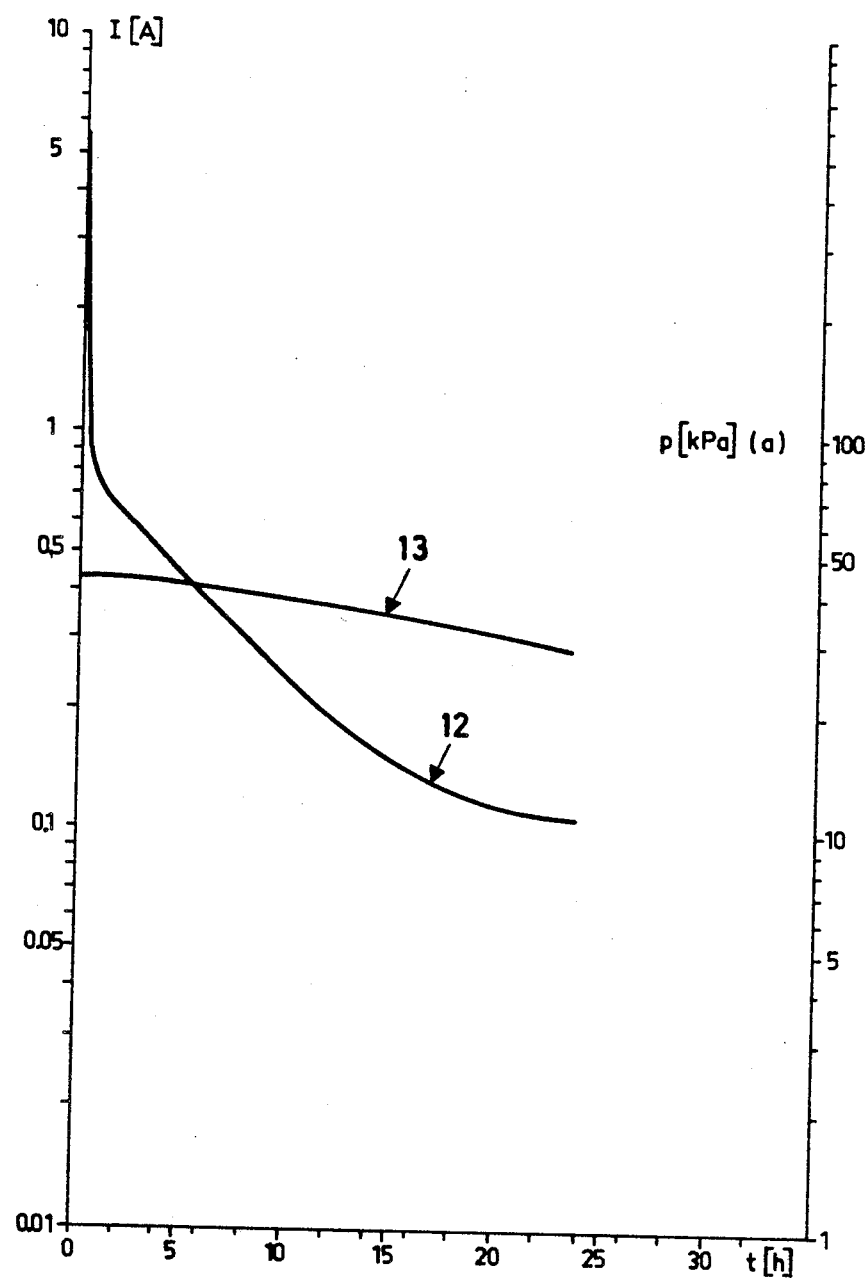
FIG. 2 is a corresponding graph for a sealed lead/acid cell during charging in accordance with the invention at a constant voltage of 2.27 V at 24° C.

The graphs in FIGS. 1 and 2 are intended to illustrate the conditions of current and pressure existing in different sealed power sources during charging in accordance with the invention. FIG. 1 relates to a nickel/cadmium cell with an intentionally highly lop-sided electrode balance, namely about 40 Ah of positive capacity, and only about 13 Ah of negative capacity. The cell consisted of three powder-rolled negative plates, each with a capacity of about 4.5 Ah, surrounded by four sintered positive plates, each with a capacity of about 10 Ah. The plates, which were separated by polypropylene felt together with microporous PVC, were immersed in a KOH electrolyte with a density of 1.30 and also containing 20 g/l of LiOH, the plate tabs (the lugs) affording the possibility of recombination through the so-called 'waterline effect'.

The cell was provided with hermetic enclosure and with a constant temperature of +40° C. Before initiating charging, the gas space of the cell was evacuated to a pressure of 33 kPa(a). Charging was then initiated at a constant voltage of 1.40 V. The constant voltage-generating device operated, as is customary for such devices, at a maximized upper current limit, in this case approximately 7 A. The current dropped steeply from this value, see curve 10, to values of 1.2 A after 30 minutes, 240 mA after 5 hours, 60 mA after 24 hours, and 32 mA after 96 hours. The current was still falling at this time, but already this value corresponds to approximately 2.5 mA/Ah.

The pressure, see curve 11, increased during the first phase of charging from 33 kPa(a) to a maximum of approximately 46 kPa(a) after about 30 hours, whereupon it followed a falling path until reaching a value of 31 kPa(a) after 96 hours, i.e. just below the initial value.

This experiment, which includes extremely severe conditions for sealed operation, namely both a major deficit of negative active material and a raised operating temperature, would appear to illustrate well the advantages of the method outlined above.

FIG. 2 illustrates an experiment with a conventional, sealed lead/acid cell with a nominal 3-hour capacity of 48 Ah and with partially electrolyte-filled separators. The cell was opened so as to permit evacuation, was then sealed hermetically, thermostatically controlled at 24° C. and evacuated to a pressure of 42 kPa(a). Charging was then initiated at a constant voltage of 2.27 V. The current fell rapidly, see curve 12, from its initial value of about 5.5 A to values of 0.85 A after 30 minutes, 430 mA after 5 hours and 110 mA after 24 hours. At the latter time, which corresponds to 2.3 mA/Ah, the current was still falling.

The pressure, which is shown as curve 13, remained constant on the whole at 42–43 kPa(a) during the initial phase of charging, whereupon it fell continuously until reaching a value of 29 kPa(a) after 24 hours.

Figure 3:
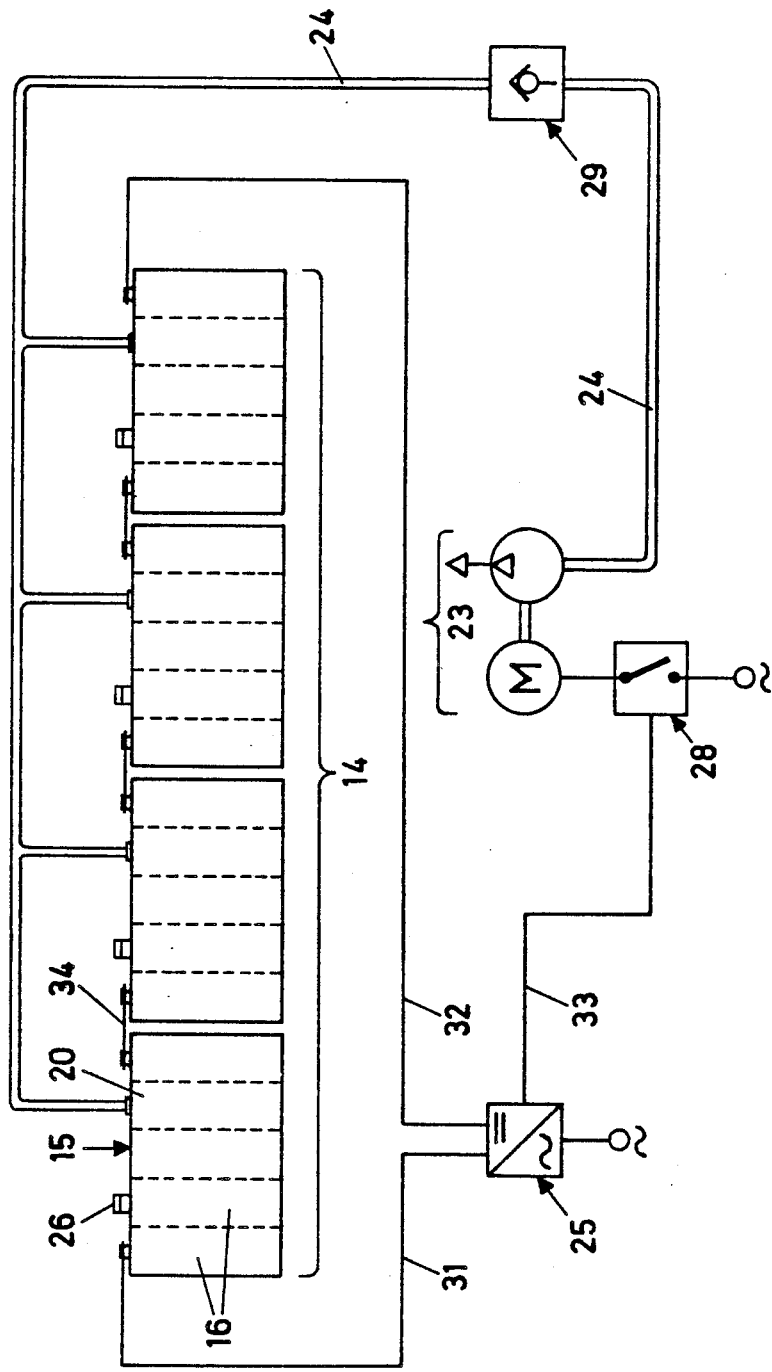
FIG. 3 shows in diagrammatic form an arrangement for the implementation of the method in accordance with the invention.
Figure 4:
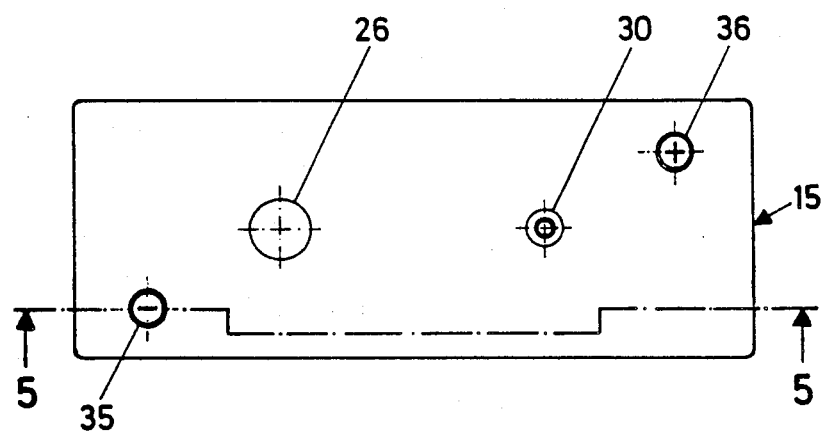
FIGS. 4 and 5 illustrate a sealed electrochemical battery included therein, FIG. 4 showing the battery in a top view and FIG. 5 showing the battery in a vertical section along the line 5—5 in FIG. 4.
Figure 5:
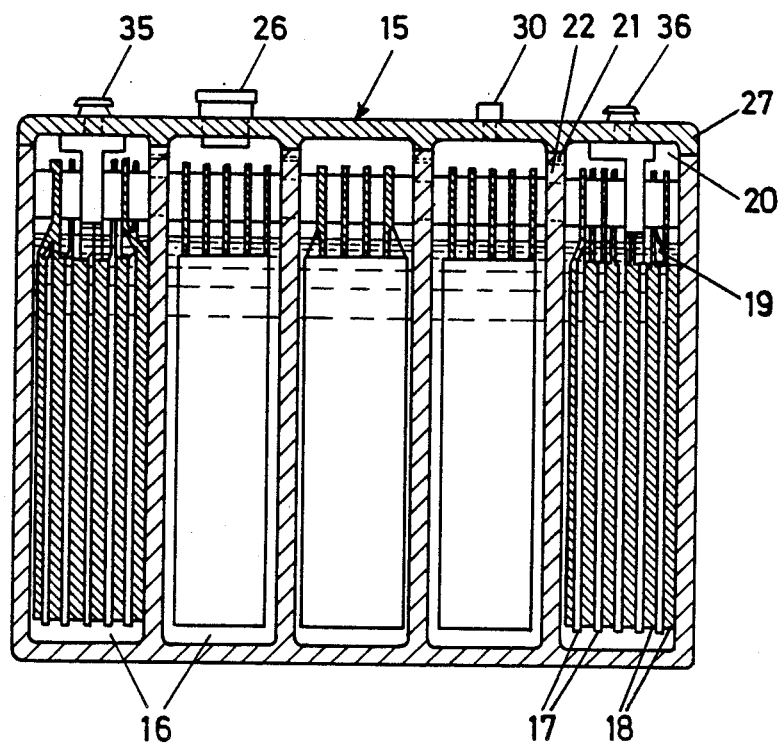

An arrangement for implementing the method is shown in FIG. 3. The arrangement contains a power source 14, which in this example consists of accumulator batteries 15, illustrated in greater detail in FIGS. 4 and 5, with a number of cells 16 containing positive electrodes 17 and negative electrodes 18, a water-based electrolyte 19 and a gas space 20, which is common to all the cells in the same battery. A common gas space 20 of this kind can be accomplished by openings 21 in the walls 22 which separate the cells.

A vacuum pump 23 is connected via an evacuation line 24 to the gas spaces 20 and is so arranged as to come into operation during charging of the power source 14. Each gas space 20 should preferably be provided with at least one re-sealing safety vent 26, intended to prevent the battery casing 27 from being exposed to harmful overpressure in the event of, for example, polarity inversion.

A control device 28 for switching on the vacuum pump 23 when the d.c. voltage source 25 comes into operation for charging may appropriately be included in the arrangement. It may also be advantageous to provide the evacuation line 24 with a check valve 29. The ability to maintain an established vacuum in the gas spaces is facilitated in this way.

The evacuation line 24 is connected to each gas space 20 via a connecting device 30 integrated into the upper surface of the battery casing. In the case of batteries for traction applications, in particular, it may be appropriate for each connecting device 30 to include a check valve. In this way the battery will retain its pressure when disconnected after charging. The d.c. voltage source 25 is connected in an electrically conducting fashion to the vacuum pump control device 28 via conductor 33 and to the electrochemical power source 14 via the conductors 31 amd 32. The batteries 15 are also connected to one another in an appropriate fashion via connections 34, by utilizing the poles 35 and 36.

INDUSTRIAL APPLICATION

The invention provides significantly broader opportunities to achieve maintenance-free operation of secondary electrochemical power sources with water-based electrolytes. It is capable of successful application to various electrode systems, such as Ni/Cd, Ag/Cd, $MnO_2$/Cd and Pb/acid, and provides freedom of choice with regard to electrode design, such as pocket electrodes or electrodes produced by pasting, sintering, powderpressing or rolling, in addition to which it also offers freedom of choice between free electrolyte or, for example in the case of partially electrolyte-filled separators, electrolyte starved condition.

The invention offers interesting possibilities for both stationary and traction applications. In the case of the former, benefits may be derived from the opportunities for a short charging time, a low steady-state current during float charging, high energy density without troublesome heat dissipation problems, and the environmentally favourable nature of the sealed system. Examples of such applications are provided by various kinds of stand-by power generating plants, in conjunction with which the need for water-filling systems is also eliminated.

The benefits associated with the stationary systems are also achieved with the traction systems, with the exception that the question of float charging does not arise. The principal advantage would appear to be associated with the opportunity for maintenance-free, energy-dense systems of high inherent capacity. The invention also offers interesting potential applications in the area of aerospace.

I claim:

1. A method for charging a sealed, secondary electrochemical power source having positive and negative electrodes, a water-based electrolyte and a gas space, and including provision for oxygen recombination at at least some part of the surface of the negative electrodes or of a plate tab associated therewith, said method comprising: reducing the pressure in the gas space from atmospheric pressure to a level not below the vapour pressure of the water present in the power source; and charging the power source by imposing a constant DC voltage while the pressure in the gas space is reduced.

2. A method according to claim 1, wherein the step of reducing the pressure in the gas space and the step of charging of the power source are initiated simultaneously.

3. A method according to claim 1, wherein the step of reducing the pressure in the gas space takes place only during an initial phase of the charging step.

4. A method according to claim 1, wherein the step of reducing the pressure in the gas space takes place via a vacuum pump.

5. A method according to claim 1, wherein the step of reducing the pressure in the gas space takes place intermittently during the charging step.

6. Apparatus for charging a sealed, secondary electrochemical power source having positive and negative electrodes, a water-based electrolyte, and a gas space, said apparatus comprising: vacuum pump means connected to the gas space via an evacuation line; charging means including d.c. voltage source means connected with the power source to maintain a constant charging voltage to the power source; and control means for operating the vacuum pump means during operation of the charging means.

7. Apparatus according to claim 6, in which the power source includes at least one battery having a casing and at least one cell wherein the cells in one and the same battery have a common gas space.

8. Apparatus according to claim 7, wherein each gas space includes at least one re-sealing safety vent to prevent the battery casing from being exposed to harmful overpressure.

9. Apparatus according to claim 6, including control means for operating the vacuum pump means when the d.c. voltage source means comes into operation for charging.

10. Apparatus according to claim 6, wherein the evacuation line includes check valve means

* * * * *